(12) United States Patent
Ham (10) Patent No.: US 9,524,391 B2
(45) Date of Patent: Dec. 20, 2016

(54) APPARATUS AND METHOD OF PORTABLE TERMINAL FOR APPLICATION DATA PROTECTION

(71) Applicant: Samsung Electronics Co. Ltd., Suwon-si, Gyeonggi-do (KR)

(72) Inventor: Dong-Eup Ham, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 481 days.

(21) Appl. No.: 13/672,095

(22) Filed: Nov. 8, 2012

(65) Prior Publication Data

US 2013/0117579 A1    May 9, 2013

(30) Foreign Application Priority Data

Nov. 8, 2011    (KR) .................. 10-2011-0115863

(51) Int. Cl.
    *G06F 11/30*    (2006.01)
    *G06F 21/60*    (2013.01)
    *G06F 21/62*    (2013.01)

(52) U.S. Cl.
    CPC .......... *G06F 21/602* (2013.01); *G06F 21/629* (2013.01)

(58) Field of Classification Search
    CPC ............... H04L 63/0428; H04L 9/3263; H04L 67/1097; H04L 9/3247; H04L 9/0822; H04L 9/14; H04L 9/0877; H04L 2209/60; H04L 2209/603; G06F 2221/2107; G06F 21/10; G06F 21/60; G06F 21/6209; G06F 21/78; G06F 21/24; G11B 20/00086
    USPC ...................................................... 713/193
    See application file for complete search history.

(56) References Cited

U.S. PATENT DOCUMENTS

| | | | |
|---|---|---|---|
| 8,510,846 B1 * | 8/2013 | Gunnarson et al. ............ 726/26 |
| 2003/0084332 A1 * | 5/2003 | Krasinski et al. ............ 713/200 |
| 2009/0202078 A1 * | 8/2009 | Bar-El et al. ................. 380/277 |
| 2009/0262926 A1 * | 10/2009 | Kabra et al. .................... 380/44 |
| 2010/0257360 A1 | 10/2010 | Bae et al. |

* cited by examiner

*Primary Examiner* — Ali Abyaneh
(74) *Attorney, Agent, or Firm* — Jefferson IP Law, LLP (57) ABSTRACT

A method of operating a portable terminal for encrypting application data is provided. The method includes receiving data input to an application, encrypting the received data by using at least one of an application unique key and a combination of a device unique key of the portable terminal and an application IDentification (ID) that is globally unique, and storing the encrypted data.

15 Claims, 7 Drawing Sheets

APPARATUS AND METHOD OF PORTABLE TERMINAL FOR APPLICATION DATA PROTECTION

PRIORITY

This application claims the benefit under 35 U.S.C. §119 (a) of a Korean patent application filed in the Korean Intellectual Property Office on Nov. 8, 2011 and assigned Serial No. 10-2011-0115863, the entire disclosure of which is hereby incorporated by reference.

BACKGROUND OF THE INVENTION

1. Field of the Invention

The present invention relates to an apparatus and method of a portable terminal. More particularly, the present invention relates to an apparatus and method of a portable terminal for application data protection.

2. Description of the Related Art

With the development of information communication technology, a variety of software suitable for several electronic devices is being developed. For example, with the development of various applications suitable for a Personal Computer (PC), a smart television, a smart phone, or other similar electronic devices, a user's desire for using several applications may be satisfied. Accordingly, a standardized method for protecting personal information included in the software has been developed. For example, a method of autonomously encrypting an application may be used. The method may prevent important data, which is included in the application, from being revealed.

However, in the aforementioned method, the important data included in the application may be revealed when other people use a browsing tool to read a directory in which the application is installed. In addition, although the application is autonomously encrypted, if other people know a key used in the application, other devices may also read information included in the application by using the same mechanism.

Accordingly, there is a need for a method for preventing personal information included in software (e.g., an application, or other similar software) from being revealed to other people.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for encrypting an application of a portable terminal by generating an application unique key by the use of a device unique key of a portable terminal and an application IDentification (ID).

Another aspect of the present invention is to provide an apparatus and method for encrypting an application to protect important information of a developer of the application.

Yet another aspect of the present invention is to provide a compatible apparatus and method which are applicable to not only a closed file system but also an open file system.

In accordance with an aspect of the present invention, a method of operating a portable terminal for encrypting application data is provided. The method includes receiving data input to an application, encrypting the received data by using at least one of an application unique key and a combination of a device unique key of the portable terminal and an application IDentification (ID) that is globally unique, and storing the encrypted data.

In accordance with another aspect of the present invention, a method of installing an application of a portable terminal is provided. The method includes decompressing compressed data including at least one application, and encrypting the decompressed data.

In accordance with another aspect of the present invention, a portable terminal apparatus for encrypting application data is provided. The apparatus includes an application module for receiving data input to an application, a platform system module for encrypting the received data by using at least one of an application unique key and a combination of a device unique key and an application identification (ID) that is globally unique, and a file system module for storing the encrypted data.

In accordance with another aspect of the present invention, an apparatus for installing an application of a portable terminal is provided. The apparatus includes a buffer for decompressing compressed data, the compressed data including at least one application, and for encrypting the decompressed data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
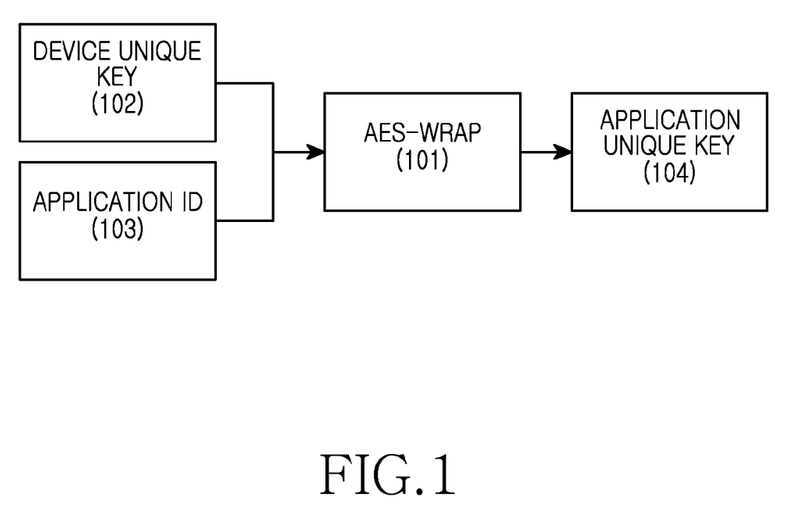
FIG. 1 illustrates an encryption method using an Advanced Encryption Standard (AES)-WRAP algorithm according to an exemplary embodiment of the present invention.

FIG. 1 illustrates an encryption method using an Advanced Encryption Standard (AES)-WRAP algorithm according to an exemplary embodiment of the present invention.

Referring to FIG. 1, an AES-WRAP algorithm 101 is a next generation standard algorithm for replacing a Data Encryption Standard (DES) which has been used for approximately 20 years as a federal standard algorithm of the United States of America (U.S.A). As stability of the DES has caused controversy since 1997, AES is promoted by National Institutes of Technology (NIST) as a project for enacting a next generation standard encryption algorithm for replacing the DES.

The AES-WRAP algorithm may be defined by Equation (1) below.

$$C = AES\text{-}WRAP(A,B) \qquad \text{Equation (1)}$$

Herein, A and B are defined as input values of the AES-WRAP algorithm 101, and C is defined as an output value of the AES-WRAP algorithm 101.

That is, AES-WRAP is an algorithm for deriving an output value, i.e., the value C, when the AES-WRAP algorithm 101 is executed by substituting any values A and B as input values of the AES-WRAP algorithm 101. More specifically, when the values A and B are input to the AES-WRAP algorithm 101 in Equation (1), then the AES-WRAP algorithm 101 generates the value C by combining the values A and B, and the generated value C is encrypted so that other people cannot recognize this value. Therefore, by using the AES-WRAP algorithm 101, encrypted information is not revealed to other people, except for a user who generates the output value C.

A device unique key 102 is a unique key assigned to a device. Examples of the device unique key include a unique number of a main board included in the device, an IDentification (ID) number of the device when Bluetooth is set, or other similarly unique numbers. In the present exemplary embodiment, as described above, by using the unique key assigned for each device, a file encrypted by using the device unique key 102 may be decoded by the device.

A globally unique application ID 103 is uniquely to each application. For example, when a developer of an application registers the application into a specific server, an application ID is assigned from the server so as to distinguish several applications that may reside on the server. That is, all applications have application IDs assigned uniquely to the respective allocations. In the present exemplary embodiment, the application ID is applied as one of the input values A and B, that are input to the AES-WRAP algorithm 101.

An application unique key 104 is defined as a key assigned uniquely to an application, the key being unique to the device. In the present exemplary embodiment, the application unique key 104 is an output value output by the AES-WRAP algorithm 101, and a file encrypted with the application unique key 104 may be decoded by only that unique application of the device. That is, since data included in the application is encrypted by using the application unique key 104, data encrypted by using the application unique key 104 cannot be decoded in another device having the same type of application or another application of the same device.

In the present exemplary embodiment, the application unique key 104 is generated according to Equation (2) below.

$$DUAK = AES\text{-}WRAP(DUK, APPID) \qquad \text{Equation (2)}$$

As described above, DUK denotes the device unique key 102, APPID denotes the application ID 103, and DUAK denotes the application unique key 104. That is, the device unique key 102 and the application ID 103 may be input as input values A and B of the AES-WRAP algorithm 101, and the application unique key 104 may be generated, such that only a user of the application of the device can confirm data included in the application. Therefore, since a user's important information included in the application is not revealed, the user's personal data may be protected.

Figure 2:
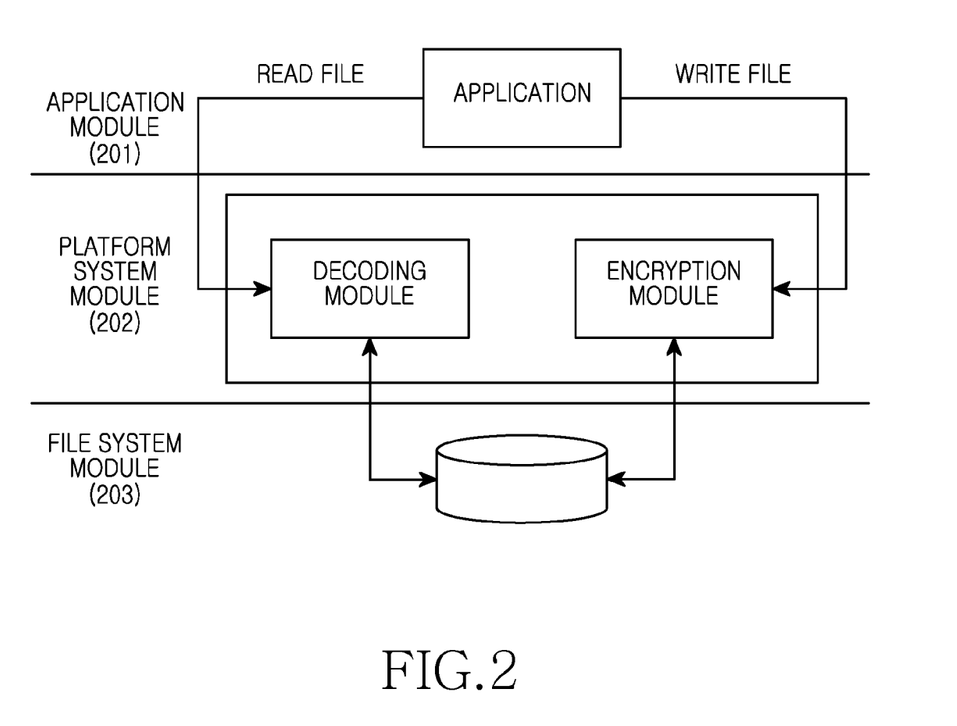
FIG. 2 illustrates an encryption and decoding process of a portable terminal according to an exemplary embodiment of the present invention.

FIG. 2 illustrates an encryption and decoding process of a portable terminal according to an exemplary embodiment of the present invention.

Referring to FIG. 2, the portable terminal may include an application module 201, a platform system module 202, and a file system module 203. First, an application is located in the application module 201 of the portable terminal of a user. The user may execute the application, may input new data to the application, and may store the input data into the file system module 203. In addition, the data stored in the file system module 203 may be received by the application module 201, and the received data may be read.

More specifically, data input by the user is stored in the application module 201, and data stored in the application module 201 is received by the platform system module 202. Data received by the platform system module 202 is encrypted through an encryption process, and the encrypted data is transmitted to the file system module 203. The file system module 203 receives and stores the data encrypted by the platform system module 202. Thereafter, in order to read the data stored in the file system module 203, the application module 201 requests the platform system module 202 to read the data. Upon receiving a data reading request from the application module 201, the platform system module 202 requests the file system module 203 to read the data. Upon receiving the data request from the platform system module 202, the file system module 203 transmits requested data to the platform system module 202. Again, the platform system module 202 receives the encrypted data in order to decode the encrypted data, and transmits the decoded data to the application module 201.

Referring to FIGS. 1 and 2, the platform system module 202 receives specific data from the application module 201, encrypts the received data, and transmits the encrypted data to the file system module 203. In addition, the platform system module 202 receives the data reading request that is transmitted from the application module 201, receives the requested data by requesting the file system module 203 to send the requested data, and transmits the received data to the application module 201 by decoding the received data. More specifically, first, the platform system module 202 receives data input to the application from the application module 201. Upon receiving the data, the platform system module 202 receives a device unique key 102 and an application ID 103 from the application module 201. That is, when at least one application is located in the application module 201, the device unique key 102 and the application ID 103, which are used to transmit data to the platform system module 202, are transmitted together with the data. Preferably, since the application module 201 and the platform system module 202 are located in the same device, the device unique key may be stored in the platform system module 202.

Herein, the device unique key 102 is a unique key assigned to the device. Examples of the device unique key 102 include a unique number of a main board included in the device, an ID number of the device when a Bluetooth is set, or other similar unique numbers. In addition, the application ID 103 is an ID assigned uniquely to each application. That is, all applications have IDs assigned uniquely to the respective allocations.

As described above, upon receiving the device unique key 102 and the application ID 103 together with data input from a specific application to which the data is input, the platform system module 202 generates an application unique key 104 by using a specific algorithm. Although various algorithms may be used as the specific algorithm to generate the application unique key 104, use of the AES-WRAP algorithm is described with reference to the present exemplary embodiments. Herein, the application unique key 104 is defined as a unique key assigned to each application. In the present exemplary embodiment, the application unique key 104 is an output value output by the AES-WRAP algorithm, and a file encrypted by using the application unique key 104 may be decoded by only the respective application of the device. That is, since data included in the application is encrypted by using the application unique key 104, data encrypted by using the application unique key 104 cannot be decoded in another device.

The platform system module 202 generates the application unique key 104 by using the AES-WRAP algorithm so as to encrypt data transmitted from the application, and then transmits the encrypted data to the file system module 203. Thereafter, the platform system module 202 receives a data reading request from the application module 201, and then receives corresponding data from the file system module 203.

The platform system module 202 receives data from the file system module 203, and then receives a device unique key 102 and an application ID 103 from a specific application which requests data reading. The platform system module 202 receives the device unique key 102 and the application ID 103, and then generates an application unique key 104 by using the AES-WRAP algorithm in the same manner as in the aforementioned encryption process, and decodes the encrypted data by using the generated application unique key 104. The reason of using the AES-WRAP algorithm when the platform system module 202 decodes the encrypted data is that a decoding process is symmetric to the encryption process, and thus requires the same procedure. That is, when decoding the encrypted data, the application unique key 104 is generated according to the AES-WRAP algorithm by using the device unique key 102 and the application ID 104 as input values.

Thereafter, the encrypted data is decoded by using the generated application unique key 104. In the aforementioned decoding process, the platform system module 202 may receive encrypted data from the file system module 203, and may generate the application unique key 104 by using the AES-WRAP algorithm. However, the application unique key 104 may be first generated and then may be decoded. That is, the platform system module 202 may generate the application unique key 104 in advance, and then may decode encrypted data transmitted from the file system module 203, or encrypted data may be first received from the file system module 203 and then the application unique key may be generated and decoded.

If the platform system module 202 receives encrypted data from the file system module 203 and transmits decoded data to the application module 201 after completing decoding, then the method of operating the encryption and decoding modules of the portable terminal ends.

Figure 3:
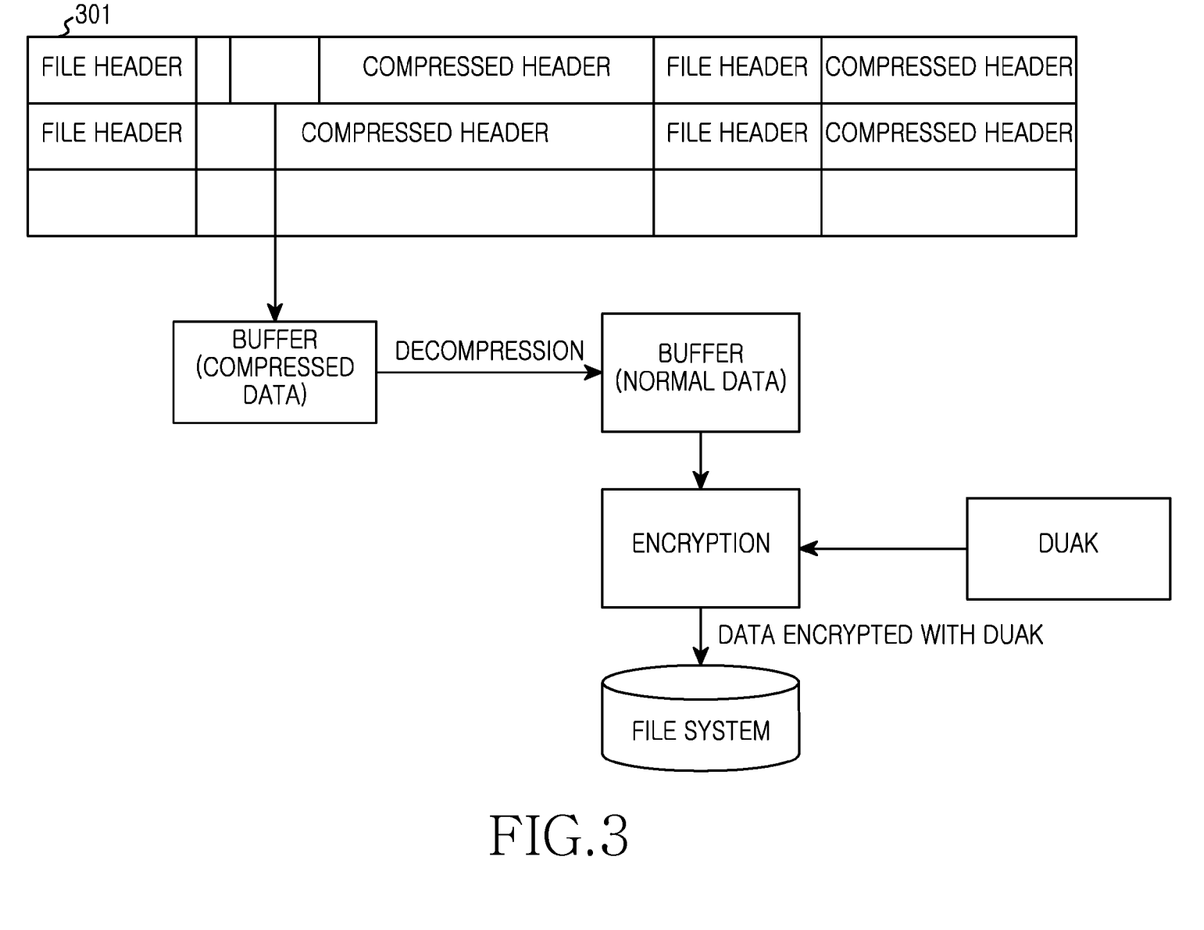
FIG. 3 illustrates data encryption when an application is installed from an application package according to an exemplary embodiment of the present invention.

FIG. 3 illustrates data encryption when an application is installed from an application package according to an exemplary embodiment of the present invention.

Referring to FIG. 3, when a compressed file 301, including an application, is installed in a device of a user, data is immediately encrypted and stored.

The compressed file 301 is a file which includes at least one application. A file header and a compressed file exist in the compressed file 301, which includes each application. More specifically, a name of the compressed file 301, a size of the compressed file 301, and other file characteristics, are stored in the file header. That is, by using information stored in the file header, a user may confirm information on the name of the compressed file, the size of the compressed file 301, and other file characteristics. A file corresponding to file information stored in the file header is compressed in the compressed file 301.

In general, an application packet uses a zip file format. For example, Apple's iPhone Operating System (OS) uses a ".ipa" format as the zip file format, Google's Android OS uses a ".apk." format as the zip file format, and Samsung's bada OS uses a ".oap" format as the zip file format. However, when an application package having one of the aforementioned compression or zip file formats is installed in a device, a non-encrypted file exists in the device's file system. More specifically, when an application packet which uses a zip file format is installed in a file system of a user's device, a zip file for the application packet is stored in the file system of the user's device after creating a temporary file. That is, in a process of installing the zip file in the user's device, the application packet is stored in the file system of the user's device in a non-encrypted temporary file format. Therefore, there is a possibility of revealing user's important information that is stored in the application.

However, according to the present exemplary embodiment, when the application package having the compression file format is installed in the user's device, compressed data delivered from a storage unit of the user's device is directly encrypted by a buffer. Thus, the data is not stored in the file system of the user's device using a non-encrypted temporary file format during a process of installing the compressed file. That is, in a method used of the present exemplary embodiment, the buffer, which is read from the compressed file, directly encrypts the compressed file and stores the encrypted file in the file system, thereby preventing the non-encrypted file, i.e., the compressed file from being temporarily present in the file system.

A process of directly encrypting a file when installing an application to an installation device from an application packet will be described in detail. First, an application packet, which includes at least one application, is stored in a storage unit of the device using a compression file format so as to be a compressed file. In order to install the application to a file system of the device, a buffer of the device reads, from the storage unit, the application stored in the storage unit according to the compression file format of the compressed file. Thereafter, the buffer decompresses the compressed file into decompressed normal data, i.e., data not compressed using the compression file format. When the compressed data is decompressed, the decompressed normal data is directly encrypted into the normal data and is then stored in the file system.

In the process of directly encrypting the decompressed data in the buffer, encryption is performed by using the AES-WRAP algorithm, as described above. More specifically, when the AES-WRAP algorithm is executed by substituting a device unique key 102 and an application ID 103 as input values, an application unique key 104 is generated as an output value. Thereafter, by using the generated application unique key 104, the buffer directly encrypts the decompressed normal data and stores the encrypted data in the file system. Accordingly, when the application packet is installed in the device, there is no case condition, or situation allowing for a file with a temporary file format to remain in the installation device during a decompression process, thereby protecting a user's important information.

When the application packet having the compression file format is installed according to present exemplary embodiment of FIG. 3, the direct encryption method of the present exemplary embodiment may be applied to a theme application, a web application, a flash application, or any other similar or suitable application stored on the device. First, respective application may be classified according to a type of contents included in the respective application. For example, the theme application is an application having a file with an extension name of ".smt", ".ttf", etc. The web application is an application having a file with an extension name of ".js", ".css", ".html", ".htm", etc. The flash application is an application having a file with an extension name of ".swf".

More specifically, according to another exemplary embodiment, when an application packet of the theme application type is installed in the device by applying the direct encryption method, the file with the file extension name of ".smt", ".ttf", etc., is stored by performing encryption. However, in order to apply the theme file to a platform system, the file with the extension name of ".smt" must be decoded. In this case, non-encrypted files are present. In order to prevent the non-encrypted files from being present, it is possible to apply a technique in which files are decompressed into encrypted files by applying a direct encryption method when the application packet is installed again to the device while decompressing the theme file. Likewise, in a case where the web application having the file with the extension name of ".js", ".css", ".htm", ".html", etc. is installed, contents can be protected by applying a protection method while decompressing an application package. In addition, in a case where the flash application is installed, the above is also applicable to contents having the file with the extension name of ".swf", etc.

Figure 4:
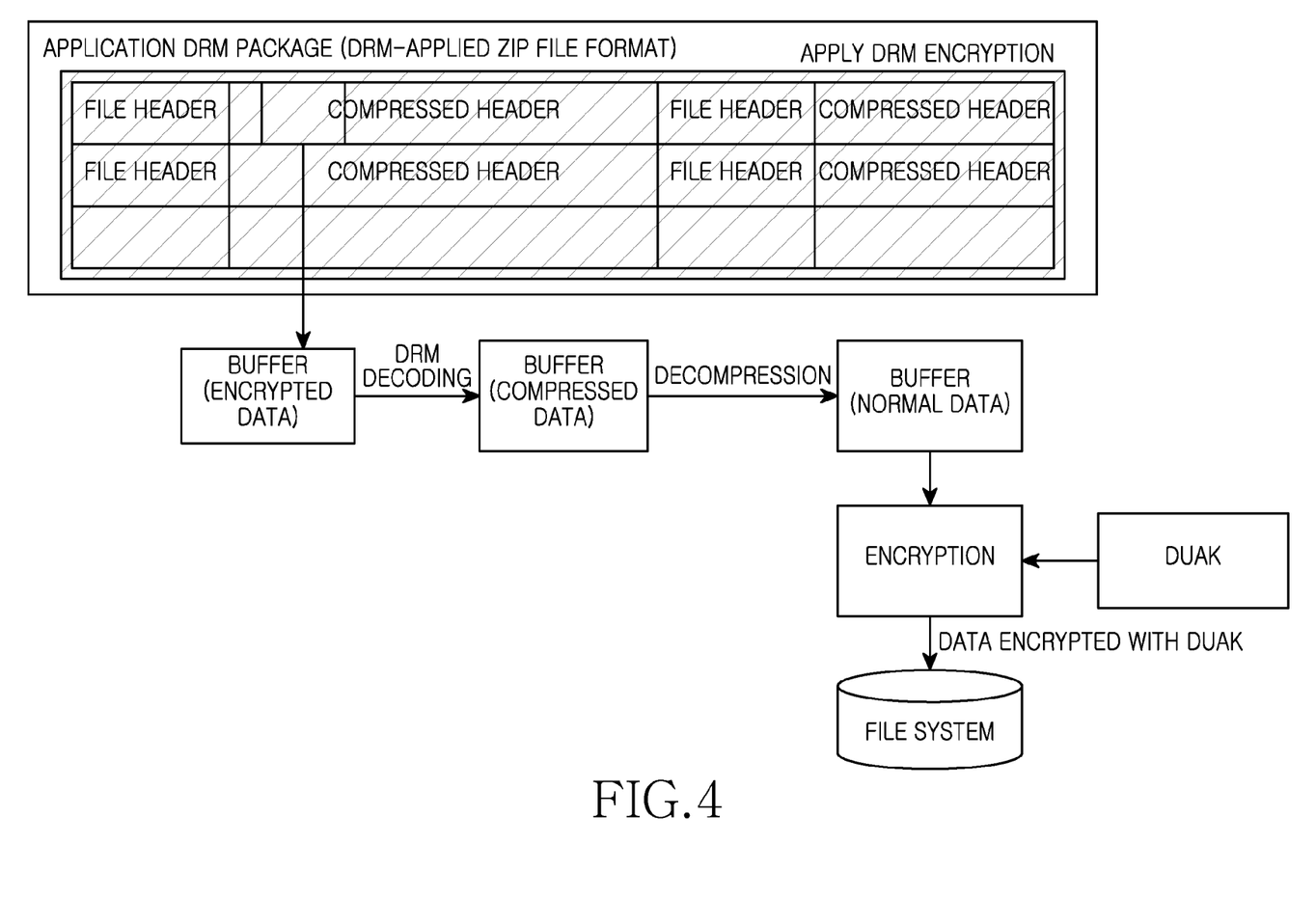
FIG. 4 illustrates data encryption when an application is installed from an application packet encrypted with Digital Rights Management (DRM) according to an exemplary embodiment of the present invention.

FIG. 4 illustrates data encryption when an application is installed from an application packet encrypted with Digital Rights Management (DRM) according to an exemplary embodiment of the present invention.

Referring to FIG. 4, an application package encrypted with DRM is transmitted from another device, and thereafter, data is directly encrypted and stored when installing the application packet to a user's device. Herein, DRM is us for managing digital copyrights, for protecting rights and interests of contents providers, for preventing illegal copies, and for collectively supporting various operations from contents generation to distribution/management, for example, usage fees and payments. The DRM includes a digital rights management technique in which only a legitimate user may use contents, a software and security technique for admitting and executing a copyright, a charge and payment technique, and other similar content consumption and rights management features.

More specifically, an installation device which intends to install an application receives an application packet encrypted with DRM from another device. Thereafter, a buffer of the installation device receives DRM-encrypted data from a communication module of the installation device, and decodes the DRM-encrypted data. In a process performed after the buffer decodes the DRM-encrypted data, data encrypted with the same process as described above in detail with reference to FIG. 3 is stored in a file system.

That is, in the process of directly encrypting the decompressed normal data in the buffer, encryption is performed by using the AES-WRAP algorithm, as described above. More specifically, when the AES-WRAP algorithm is performed by substituting a device unique key 102 and an application ID 103 as input values, an application unique key 104 is generated as an output value. Thereafter, by using the generated application unique key 104, the buffer directly encrypts the decompressed normal data and stores the encrypted data into the file system. Accordingly, when the application packet is installed in the device, there is no case where a file having a temporary file format remains in the installation device during a decompression process, thereby being able to protect user's important information.

Figure 5:
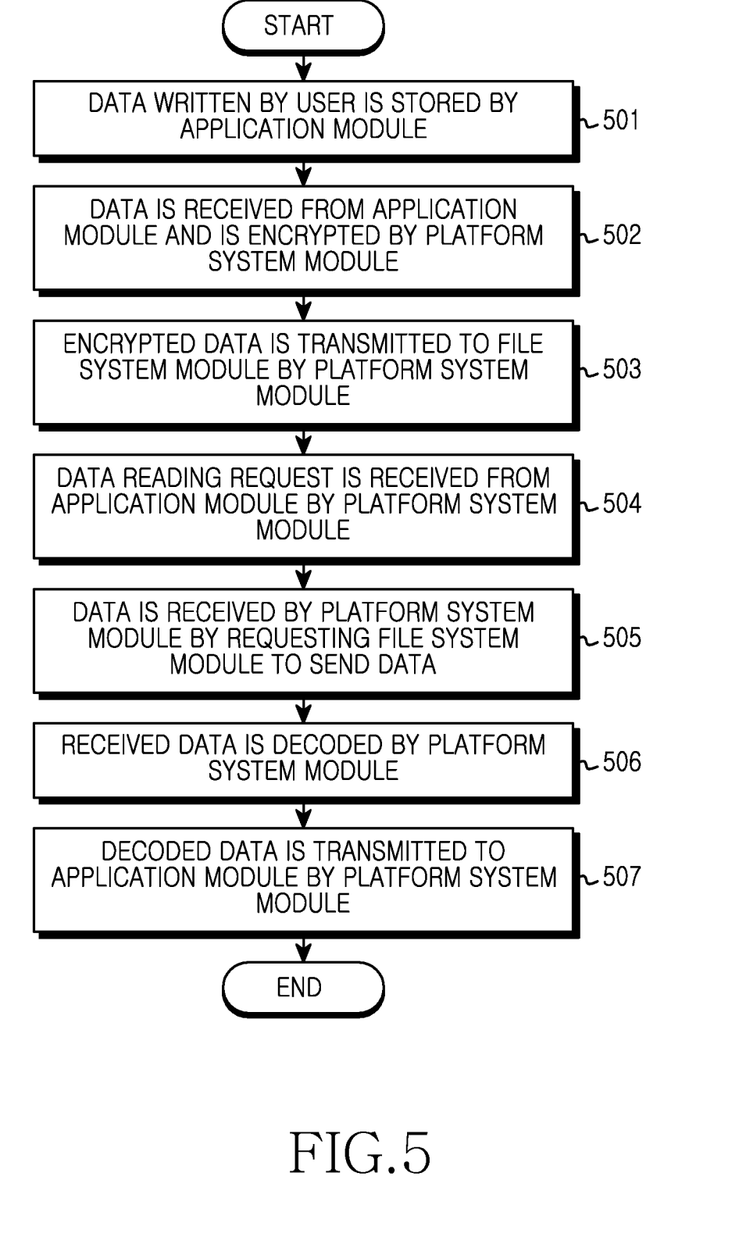
FIG. 5 is a flowchart illustrating an encryption and decoding process in a portable terminal according to an exemplary embodiment of the present invention.

FIG. 5 is a flowchart illustrating an encryption and decoding process in a portable terminal according to an exemplary embodiment of the present invention.

Referring to FIG. 5, an application module stores data written by a user at step 501. More specifically, the present exemplary embodiment is a case where a user inputs data to an application module in which at least one application is located. That is, when the user inputs data to a specific application, the input data is stored in the application module.

When the application module stores the data written by the user, a platform system module receives the data from the application module and encrypts the data at step 502. More specifically, in order for the data written by the user to be finally encrypted and stored in a file system module, the platform system module receives the data from the application module and encrypts the data. In the encryption process performed by the platform system module, upon receiving the data, the platform system module receives a device unique key and an application ID from the application module which transmits the data. That is, when at least one application is located in the application module, the device unique key and the application ID, which are used for encrypting and transmitting the data to the platform system module, are received together with the data. Since the application module and the platform module are located in the same device, the device unique key may be stored in the platform system module, or any suitable location. Upon receiving the device unique key and the application ID together with the data input from the specific application which inputs the data, the platform system module generates an application unique key by using the AES-WRAP algorithm. By using the generated application unique key, the platform system module encrypts the data received from the application module.

After the platform system modules receives the data from the application module and encrypts the data, the encrypted data is transmitted to the file system module by the platform system module at step 503. More specifically, the data written by the user is encrypted and stored in the file system module. That is, when specific data is stored in the file system module as received from the application module via the platform system module, the data is encrypted so that the data is not revealed to other people because the data input to the application is encrypted.

Thereafter, the application module requests the platform system module to read the data at step 504. More specifically, when the user desires to read again the data stored in the file system, a specific application module, which receives a reading request from the user, requests the platform system to send the data in order to read specific data stored in the file system. That is, since the encrypted data stored in the file system module may be read by the application module after the data is decoded in the platform system module, the application module first requests the platform system module to read the specific data.

When the platform system module receives a request for reading the specific data from the application module, the platform system module requests the file system module to send the data and, thus, receives the data at step 505. More specifically, in step 505, the platform system module receives the specific data stored in the file system module and decodes the data.

After the platform system module requests the file system module to send the data and receives the data, the platform system module decodes the received data at step 506. More specifically, in step 506, the platform system module receives specific encrypted data stored in the file system module, decodes the data, and transmits the data to the application module which requested the data. In a process of decoding specific data in the platform system module, the platform system module receives data from the file system module and then receives a device unique key and an application ID from a specific application which requested the data reading. The platform system module receives the device unique key and the application ID, and then generates an application unique key by using the AES-WRAP algorithm in the same manner as described above with reference to FIG. 2, and decodes the encrypted data by using the generated application unique key.

The reason of using the AES-WRAP algorithm when the platform system module decodes the encrypted data is that a decoding process is symmetric to the encryption process and thus uses a same procedure. That is, when decoding the encrypted data, the application unique key is generated according to the AES-WRAP algorithm by using the device unique key and the application ID as input values. Thereafter, the encrypted data is decoded by using the generated application unique key. In the aforementioned decoding process, the platform system module may receive encrypted data from the file system module, and may generate the application unique key by using the AES-WRAP algorithm. However, the application unique key may be generated first, and then decoded. That is, the platform system module may generate the application unique key in advance, and then may decode encrypted data transmitted from the file system module, or alternatively, encrypted data may be received from the file system module first, and then the application unique key may be generated and used for decoding.

If the platform system module decodes the data received from the file system module, the platform system module transmits the decoded data to the application module at step 507. The application module receives the decoded data from the platform system module and stores the data, Thereafter, according to a user's request, when the decoded data is displayed in a display unit of the device, the encryption and decoding process ends.

The method described above in relation with FIG. 5 under of the present invention may be provided as one or more instructions in one or more software modules, or computer programs stored in an electronic device including a portable terminal.

Figure 6:
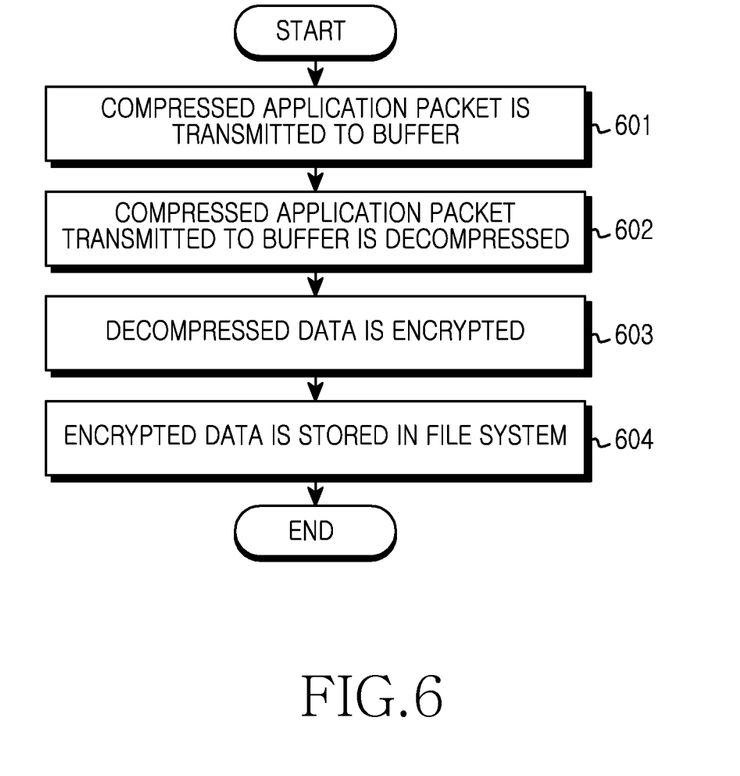
FIG. 6 is a flowchart illustrating a data encryption process when an application is installed from an application package according to an exemplary embodiment of the present invention.

FIG. 6 is a flowchart illustrating a data encryption process when an application is installed from an application package according to an exemplary embodiment of the present invention.

Referring to FIG. 6, a compressed application package stored in a storage unit of an installation device is first transmitted to a buffer at step 601. More specifically, when an application packet stored in the storage unit with a compression file format is to be installed on the device, the buffer reads the application packet stored in the storage unit. In general, an application packet uses a zip file format. However, a problem may occur when an application package having the aforementioned compression file format is installed in a device, such that a non-encrypted file exists in a file system. More specifically, when an application packet, which uses a zip file format, is installed in a file system of a user's device, a zip file of the application packet is stored in the file system of the installation device after creating a temporary file. That is, in a process of installing the zip file in the device, the application packet is stored in the file system of the device in a non-encrypted temporary file format. Therefore, user's important information stored in the application may be revealed. However, according to the present exemplary embodiment, when the application package having the compression file format is installed in the user's device, compressed data delivered from a storage unit is directly encrypted by the buffer. Thus, the data is not stored in the file system of the device with a non-encrypted temporary file format during the process of installing the zip file. That is, according to the present exemplary embodiment, the buffer, which is read from the compressed file, directly encrypts the file and stores the encrypted file in the file system, thereby preventing the non-encrypted file from being temporarily present in the file system.

Although not shown in FIG. 6, after receiving a DRM-encrypted application packet from another device, data may be directly encrypted and stored when installing the application packet on the user's device. In this case, if the application packet is encrypted with DRM, the buffer receives DRM-encrypted data from another device through a communication module of the installation device and decodes the data.

After the compressed application packet is transmitted to the buffer at step 601, the buffer decompresses the received compressed application packet at step 602. More specifically, the compressed data stored in the storage unit is transmitted to the buffer at step 601, and the compressed data is decompressed into normal data at step 602.

Thereafter, the decompressed data is encrypted at step 603. During the process of directly encrypting the decompressed normal data, encryption is performed by using the AES-WRAP algorithm, as described above. More specifically, when the AES-WRAP algorithm is performed by using a device unique key and an application ID as input values, an application unique key is generated as an output value. Thereafter, the buffer directly encrypts the decompressed normal data by using the generated application unique key.

After the decompressed normal data is directly encrypted by using the AES-WRAP algorithm as step 603, then the encrypted data is stored in the file system at step 604. In the present exemplary embodiment, when the application packet is installed in the device, the data of the application packet is directly encrypted and stored in the file system, as described above. Accordingly, when the application packet is installed in the device, there is no case where a file with a temporary file format remains in the installation device during the decompression process, thereby protecting a user's important information.

The method described above in relation with FIG. 6 under of the present invention may be provided as one or more instructions in one or more software modules, or computer programs stored in an electronic device including a portable terminal.

The present invention may be implemented in an electronic device including a portable terminal such as, for example, a smart phone and a mobile telecommunication terminal. Hereunder, a portable terminal is used as an example for the electronic device.

Figure 7:
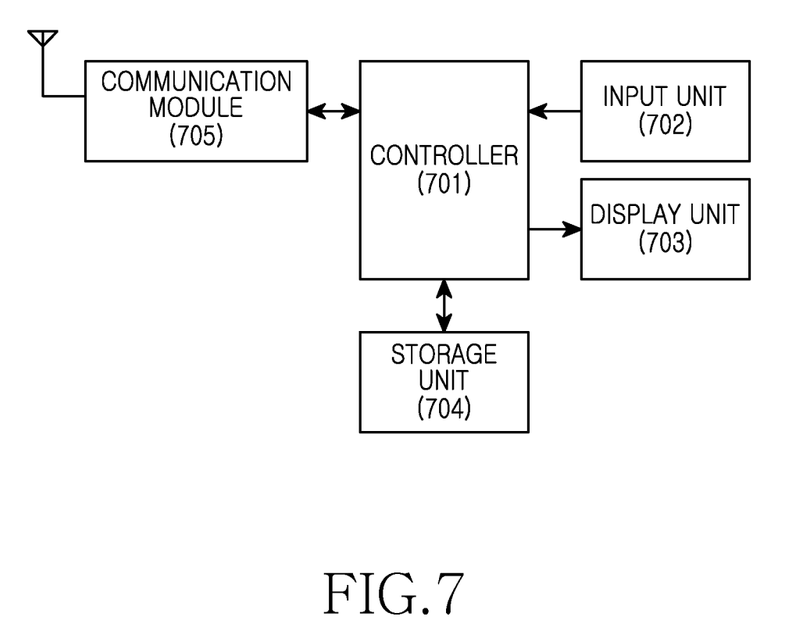
FIG. 7 is a block diagram illustrating a structure of a portable terminal according to an embodiment of the present invention.

FIG. 7 is a block diagram illustrating a structure of a portable terminal according to an embodiment of the present invention.

Referring to FIG. 7, the portable terminal includes a controller 701, an input unit 702, a display unit 703, a storage unit 704, and a communication module 705.

The controller 701 provides overall control to the portable terminal. The controller 701 may include, as shown in FIG. 2, an application module 201, a platform system module 202, and a file system module 203, and may include, as shown in FIG. 3, a buffer.

The application module 201 receives data input to an application, and receives decoded data from the platform system module. The platform system module 202 encrypts the received data by using an application unique key, receives a data request from the application module, and decodes the encrypted data by using the application unique key. Furthermore, by using at least one of a device unique key of the portable terminal and an application ID as input values, the application unique key is generated according to the algorithm described above, and the received data is encrypted by using the generated application unique key. Furthermore, by using at least one of the device unique key of the portable terminal and the application ID as the input value, the application unique key is generated according to the algorithm described above, and the encrypted data is decoded by using the generated application unique key. The file system module 203 stores the encrypted data.

The buffer decompresses the compressed data, including at least one application, and encrypts the decompressed data. Furthermore, by using at least one of a device unique key of the portable terminal and an application ID as input values, the application unique key is generated according to the algorithm described above, and the decompressed data is encrypted by using the generated application unique key. Furthermore, compressed data processed with DRM is decoded.

The input unit 702 provides the controller 701 with input data generated by a user's selection and/or input. The display unit 703 displays state information of the portable terminal, a menu screen, and story information under the control of the controller 701. The storage unit 704 may include a program storage unit for storing a program for controlling an operation of the portable terminal and a data storage unit for storing data generated while the program is executed. For example, compressed data, including at least one application, is stored.

The communication module 705 processes a signal transmitted and received through an antenna for voice and data communications. For example, compressed data, which is processed with DRM and includes at least one application, is received from another portable terminal via the communication module 705.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In the aforementioned structure, the controller 701 may perform overall functions of the terminal. However, these functions are separately configured and illustrated in the present exemplary embodiments in order to describe their respective functions separately. Therefore, according to the present exemplary embodiments, all functions of the portable terminal may be processed by the controller 701 or, alternatively, only some of the functions of the portable terminals may be processed by the controller 710

While the invention has been shown and described with reference to exemplary embodiments thereof, it will be understood by those skilled in the art that various changes in form and details may be made therein without departing from the spirit and scope of the present invention as defined by the appended claims and their equivalents.

What is claimed is:

1. A method in a portable terminal, the method comprising:
   receiving, by an application processor, application data inputted corresponding to execution of an application;
   transmitting, by the application processor, the received application data, a device unique key assigned to the portable terminal and an application identification assigned to the application, to a platform system processor;
   generating, by the platform system processor, an application unique key for encrypting the received application data using the device unique key and the application identification;
   encrypting, by the platform system processor, the received application data using the application unique key;
   transmitting, by the platform system processor, the encrypted application data to a file system processor;
   storing, by the file system processor, the encrypted application data in a file system;
   receiving, by the platform system processor, a request for the application data input corresponding to the application from the application processor and generating, by the platform system processor, the application unique key from the device unique key and the application identification; and
   decoding, by the platform system processor, the encrypted application data by using the application unique key and outputting, by the platform system processor, the decoded application data to the application processor.

2. The method of claim 1, wherein the application processor stores the device unique key and the application identification.

3. The method of claim 2, further comprising:
   receiving, by the platform system processor, the received application data, the device unique key, and the application identification from the application processor.

4. The method of claim 1,
   wherein the application processor stores the application identification, and
   wherein the platform system processor stores the device unique key.

5. The method of claim 4, further comprising:
   receiving, by the platform system processor, the received application data and the application identification from the application processor.

6. The method of claim 1, wherein the application processor stores the device unique key and the application identification.

7. The method of claim 6, wherein the generating of the application unique key comprises:
   receiving, by the platform system processor, the device unique key and the application identification from the application processor.

8. The method of claim 1,
   wherein the application processor stores the application identification, and
   wherein the platform system processor stores the device unique key.

9. The method of claim 8, wherein the generating of the application unique key comprises:
   receiving, by the platform system processor, the application identification from the application processor.

10. A portable terminal comprising:
    a memory storing one or more computer programs;
    an application processor, configured to execute the one or more programs to:
       receive application data inputted corresponding to execution of an application, and
       transmit the received application data, a device unique key assigned to the portable terminal and an application identification assigned to the application, to a platform system processor;
    the platform system processor configured to execute the one or more programs to:
       generate an application unique key for encrypting the received application data using the device unique key and the application identification,
       encrypt the received application data using the application unique key, and
       transmit the encrypted application data to a file system processor; and
    the file system processor configured to execute the one or more programs to store the encrypted application data in a file system,
    the platform system processor further configured to execute the one or more programs to:
       receive, by the platform system processor, a request for the application data input corresponding to the application from the application processor,
       generate, by the platform system processor, the application unique key from the device unique key and the application identification,
       decode, by the platform system processor, the encrypted application data by using the application unique key, and
       output, by the platform system processor, the decoded application data to the application processor.

11. The apparatus of claim 10,
    wherein the platform system processor is further configured to:
       receive a request of the application data from the application processor, and
       decode the encrypted application data by using the application unique key, and
    wherein the application processor is further configured to receive the decoded application data from the platform system processor.

12. The apparatus of claim 10, wherein the application processor stores the device unique key and the application identification.

13. The apparatus of claim 12, wherein the platform system processor is further configured to receive the received application data, the device unique key, and the application identification from the application processor.

14. The apparatus of claim 10,
    wherein the application processor is further configured to store the application identification, and
    wherein the platform system processor is further configured to store the device unique key.

15. The apparatus of claim 14, wherein the platform system processor is further configured to receive the received application data and the application identification from the application processor.

* * * * *